May 1, 1956  C. R. ECKBERG  2,744,178
CONTROL APPARATUS
Filed May 24, 1952  2 Sheets-Sheet 1
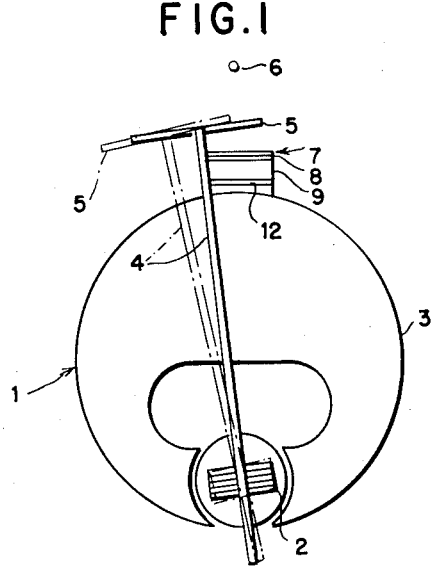
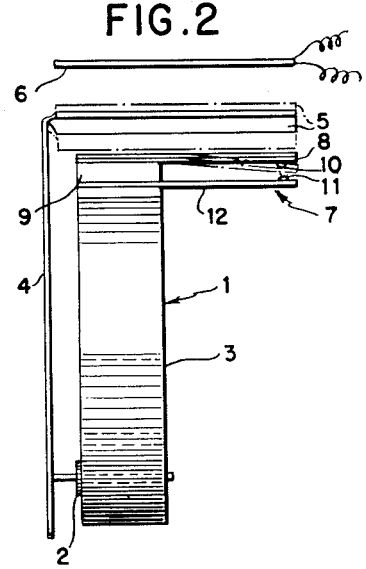
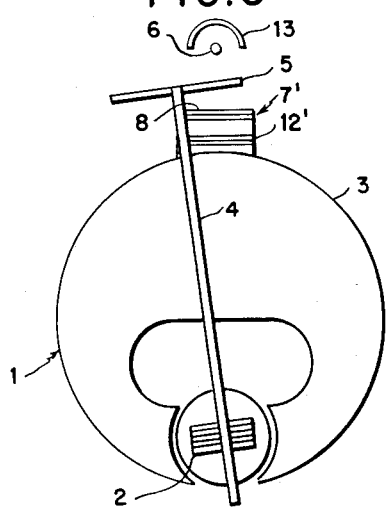
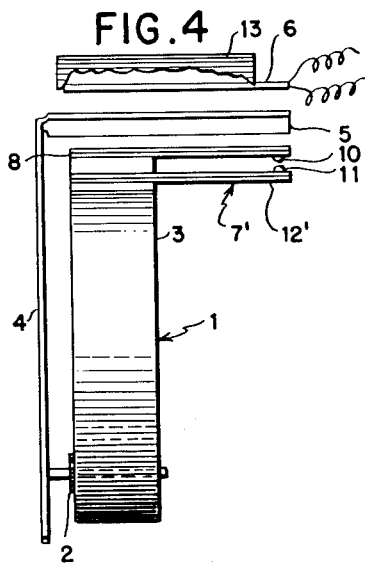
INVENTOR.
Curtis R. Eckberg
BY
Adams, Forward and McLean
ATTORNEYS May 1, 1956 C. R. ECKBERG 2,744,178
CONTROL APPARATUS
Filed May 24, 1952 2 Sheets-Sheet 2
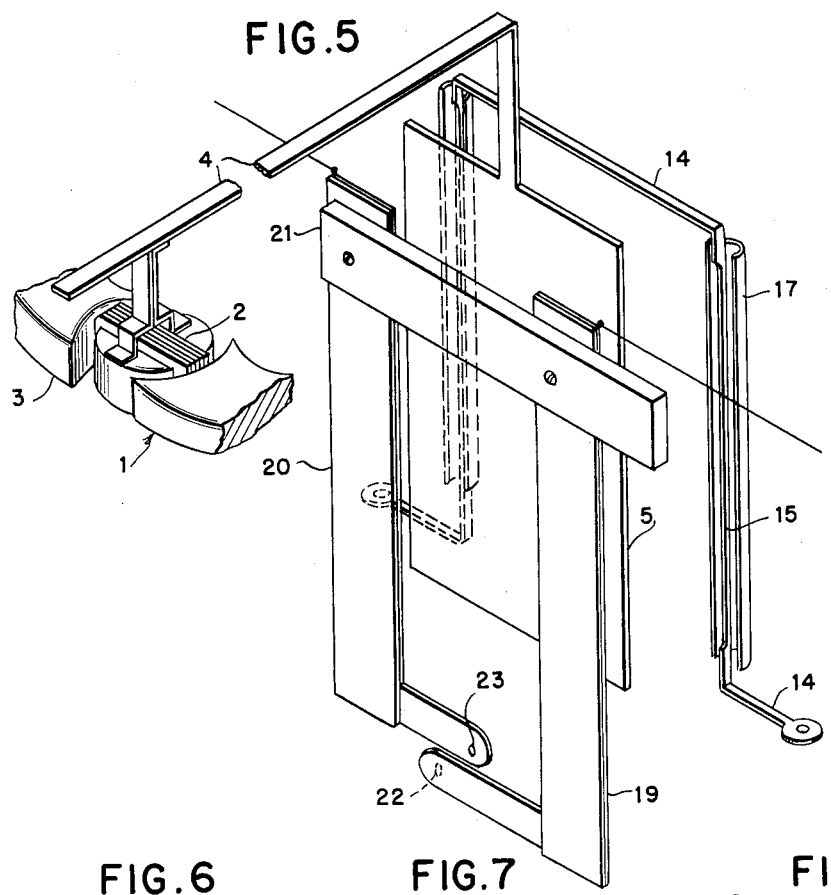
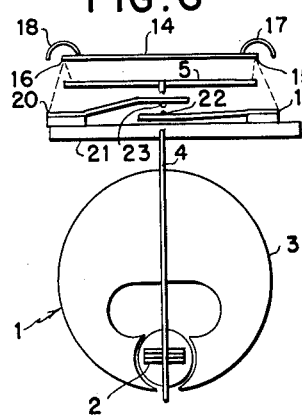
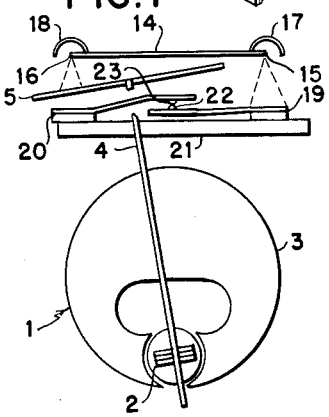
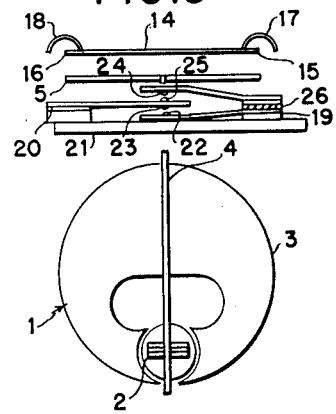
INVENTOR.
Curtis R. Eckberg
BY
Adams, Forward and McLean
ATTORNEYS United States Patent Office 2,744,178
Patented May 1, 1956

2,744,178

CONTROL APPARATUS

Curtis R. Eckberg, Port Washington, N. Y.

Application May 24, 1952, Serial No. 289,912

9 Claims. (Cl. 200—138)

I have invented a control instrument of simple mechanical and electrical construction which acts as a sensitive electrical relay having particular utility in actuating and deactuating electrical circuits in response to minute mechanical changes of an indicating instrument. In particular, my invention is useful in the control of process conditions and the like in accordance with mechanical indications of small control voltages developed in response to such process conditions, as for example in the control of electric furnaces in which temperature is measured by the potential developed in a thermocouple or in the control of acid or base addition to chemical processes in which pH condition is measured by the potential of an electrode. My invention is also useful in the control of process conditions and the like in accordance with directly responsive mechanical indicators of such conditions.

Many industrial processes are controlled in response to small electrical potentials, such as are produced by a thermocouple or by an electrode immersed in an electrolyte. In such processes it is desirable to control the value of a process variable in response to minute changes in voltage produced in such potential producing measuring devices. Control instruments heretofore utilized have generally involved electronic apparatus to actuate a heavy duty relay which controls a circuit governing a signal, alarm or means for correcting the variable. Such instruments are undesirably complicated and costly thus prohibiting their use in many applications where it is otherwise desirable to effectuate automatic control. Generally, the best indicating instrument in such applications is a galvanometer type movement, such as the D'Arsonval movement, which can be made highly sensitive to potential changes measured in values less than a microvolt. However, it is highly impractical to utilize a galvanometer in the control of heavy duty relays and the like since the motor action of the galvanometer is extremely weak. It has been heretofore suggested to utilize a galvanometer to actuate a heavy duty relay by causing it to vary the inductance of a coil in an amplifier or an oscillator circuit by attaching a small, lightweight vane to the end of the galvanometer pointer which varies the inductance of the coil when it is placed near the coil.

Other industrial processes are controlled by sensitive indicator instruments which directly reflect changes of a particular process variable by mechanical movement. Typical of such instruments is the Bourdon tube which indicates pressure by the position of a rotatable needle actuated by the curvature of a spiralled hollow tube having an elliptical cross-section. Like the galvanometer, the indicating armature of such instruments is generally incapable of controlling heavy duty electrical switches and the like since, in order to render the instrument sensitive, a great sacrifice is made in favor of mechanical advantage.

Hereinafter I will discuss my invention as it is applied to a galvanometer instrument because such usage is typical of its operation with all instruments which indicate changes in a measurable variable quantity by mechanical movement.

I have discovered that the least detectable movements of sensitive instruments, such as the movement of a galvanometer in response to potential changes of less than a microvolt, may be utilized to actuate heavy duty relays without the use of complicated electronic instruments by attaching a vane opaque to radiant heat to the armature, i. e., the mobile indicating member, of the galvanometer in such a manner that in part of the arcuate path developed by the vane it is interposed between a radiant heat source and a thermostatic switch, that is, one or more thermally responsive bimetallic members designed to actuate a heavy duty electrical switch in response to temperature changes.

Such a bimetallic thermostatic switch can be simply operated by placing a small radiant heat source, such as a current carrying filament, within the galvanometer casing so that a thin, heat-reflecting vane attached to the pointer, or elsewhere to the armature, will control the passage of radiant heat from the heated filament to the bimetallic switch as it swings through part of its path. Thus, if the position of the vane is adjusted to interrupt the radiation of heat from the heat source to the thermostatic switch when the voltage from the measuring element, e. g., thermocouple, is at the desired operating level, any decrease in the control voltage in response to a decrease from the desired operating level at the measuring element will cause the galvanometer armature to rotate, remove the vane and allow heat to radiate from the heat source to the thermostatic switch. The temperature of the switch is thereby increased so as to actuate it and energize an alarm circuit, or energize or de-energize a control circuit, depending on the nature of the circuit controlled by the thermostatic switch and whether the switch is designed to open or close as its temperature is raised.

The simple arrangement described above represents the fundamental principles of my invention but it also has some disadvantages because it does not compensate for variations in the ambient temperature or in variations in heat given off by the filament. For the control apparatus to operate accurately, the vane position must exactly determine the relative contact position, and any variables which also influence the relative contact position will degrade performance. Variations in the ambient temperature cause deflections of the bimetallic switch independently of the vane position and hence introduce undesirable variations in the relative contact position. Similarly, variations in the total heat given off by the filament are undesirable, first, because they affect the ambient temperature and, second, because heat radiated to the bimetallic switch will vary the deflection of the strip although the vane is not moved.

Compensation for the ambient variations is obtained by utilizing a pair of bimetallic strips each identical to the other in thermal characterstics and each having a contact mounted to it. The pair of bimetallic strips are mounted similarly so each will deflect with ambient temperature changes the same as the other and in this manner maintain the relative contact position constant. Compensation for the variations of the radiated heat is obtained by utilizing a pair of heated filaments, each associated with one of the bimetallic strips. In this situation, with the vane located so heat is equally radiated to the strips, each strip will be identically affected by variations in the radiated heat and will main the relative contact position constant.

Thus, fundamentally the control instrument of my invention includes a radiant heat source, a thermally responsive bimetallic element associated with the heat source so as to receive heat radiated from the heat source, and a moving vane, opaque to radiant heat, having a path of travel passing between the heat source and the bimetallic element. The moving vane is adapted to be moved by the armature movement of an indicating instrument, such as a galvanometer, and the bimetallic element is adapted to actuate an electrical circuit as it moves in response to a change of its temperature.

In its preferred form, the control instrument of my invention includes a first radiant heat source, a first thermally responsive bimetallic element associated with the first heat source so as to receive heat radiated therefrom, a second radiant heat source, a second thermally responsive bimetallic element associated with the second heat source so as to receive heat radiated therefrom, and a moving vane, opaque to radiant heat, having a path of travel passing between each heat source and its associated bimetallic element. The bimetallic elements must have substantially identical thermal response characteristics for best results and are positioned so as to respond similarly with respect to each other for a given temperature change. As in the case of the fundamental instrument of my invention, the moving vane is adapted to be moved by the armature movement of an indicating instrument, such as a galvanometer. The two bimetallic elements are adapted to actuate an electrical circuit as they move in response to a change in the position of the vane.

Advantageously the bimetallic elements are arranged in fixed relation at one end of each and free to move at the other end of each. The two heat sources are disposed extremely close to the line of travel of the vane and the vane width is advantageously equal to the spacing between the heat sources.

Preferably, the bimetallic elements are placed parallel to each other on the same side of the path of travel of the moving vane, so positioned that at the desired operating point the vane equally reduces the flow of radiant heat to each bimetallic strip. Appropriate electrical contacts are mounted on the free ends of the bimetallic elements in such a position that they will make electrical contact with each other when the free ends come together.

In order more fully to understand my invention, I have illustrated in Figure 1 of the drawings a plan view of a simple form of the control instrument of my invention.

Figure 2 is a side view of the same instrument.

Figures 3 and 4 are respectively a plan view and a side view of another instrument in accordance with my invention.

Figure 5 is an isometric view of a preferred form of my invention.

Figures 6 and 7 illustrate the operation of the same device while Figure 8 illustrates another arrangement according to the preferred form of my invention for producing a different electrical control. For clearer understanding of my invention, in all the figures the size of the galvanometer has been shown in smaller proportion to the rest of the instrument.

The instrument in Figures 1 and 2 is a control instrument adapted to close an electrical switch in response to counter-clockwise movement of galvanometer 1. Galvanometer 1 has a D'Arsonval type movement governed by the passage of electrical current through small armature coil 2 which is rotatably positioned in a magnetic field produced by magnet 3. Typically, galvanometer 1 is utilized to indicate the potential developed in a device such as a thermocouple or electrode which is connected to moving coil 2. For example, moving coil 2 may be connected to a thermocouple which is positioned in a furnace to indicate the temperature within the furnace.

Pointer 4 is attached to coil 2 of galvanometer 1 and swings through an arcuate path at its tip as the potential impressed across coil 2 is varied. A thin aluminum foil vane 5 is attached at the top of pointer 4 advantageously beyond magnet 3 so as not to interfere with it in the normal swing of pointer 4. A radiant heat source in the form of current carrying filament 6 is positioned on one side of the path of travel of vane 5. A thermostatic switch 7 is disposed on the opposite side of the path of travel of vane 5 so that it will receive the heat radiated from heat source 6 when vane 5 is not lying between heat source 6 and thermostatic switch 7.

Thermostatic switch 7 is made of a bimetallic strip 8 which is fixed to an insulated spacer 9 at its upper end and which has an electrical contact 10 mounted on the less expansive side of its free end. A second electrical contact 11 is mounted on the free end of metal bar 12 which has its other end fixed on the opposite side of insulated spacer 9. Contacts 10 and 11 are disposed so that when the free end of bimetallic strip 8 is bent toward metal bar 12 contacts 10 and 11 will touch each other and thus complete an external electrical circuit passing through them utilized to control a heating element, sound an alarm or effect some other useful operation.

In order to illustrate the use of the device shown in Figures 1 and 2, I will discuss it as though coil 2 of galvanometer 1 were connected to a thermocouple responsive to the temperature of a furnace which is controlled by an electrical heating element which has its power circuit connected through thermostatic switch 7 of my instrument. The position of pointer 4 is adjusted in relation to armature coil 2 of galvanometer 1 so that vane 5 just completely intercepts all heat directly radiated from filament 6 to thermostatic switch 7 when the furnace is at proper operating temperature. In such conditions switch 7 is in the open position, i. e. contacts 10 and 11 are apart. This condition is indicated by the solid line position in Figures 1 and 2.

When the temperature of the furnace drops below operating temperatures, the thermocouple voltage is decreased thereby causing armature coil 2 to rotate through a small counter-clockwise angle with respect to galvanometer 1 and thus vane 5 is moved to a position to the left, indicated by the dotted line position in Figures 1 and 2. As a result of the movement of vane 5, heat is radiated from filament 6 to thermostatic switch 7 with the result that the thermally responsive bimetallic strip 8 increases in temperature and therefore bends toward metal bar 12 bringing contacts 10 and 11 together, closing the power circuit of the heating element in the furnace.

This action energizes the heating circuit of the furnace causing the temperature of the furnace to be restored to the desired operating temperature. When the operating level is again attained, the thermocouple output will have risen and consequently vane 5 will return to its initial position completely preventing direct radiation of heat from filament 6 to thermostatic switch 7 which by the reverse procedure opens and thus de-energizes the heating circuit in the furnace.

The device in Figures 3 and 4 in all respects is similar to that shown in Figures 1 and 2. I have added a second bimetallic strip 12' instead of the metal bar 12. This strip has similar characteristics to the strip 8 and is mounted similarly so that the two strips deflect together with changes in ambient temperature without changing the relative position of the contacts 10 and 11. I have added a heat reflector in the form of a semi-cylindrical strip of polished metal 13 which is disposed behind filament 6 in relation to its associated thermostatic switch 7'.

It is thus evident that the devices shown in Figures 1 and 2 and Figures 3 and 4 may be utilized in a variety of arrangements to produce different electrical controls in response to different types of movement. Other types of indicating instruments, of course, may be substituted for galvanometer 1, such as a Bourdon pressure gauge or the indicating needle of a torque measuring device. Different arrangements of the thermostatic switch may be substituted. For example, the switch may be adapted to make one contact while it breaks another.

One precaution should be taken in using my invention, namely, provision should be made to prevent the moving vane from over traveling. This is most easily accomplished by placing stops in the path of the pointer or vane which limit its travel in the wrong direction.

The device in Figures 5, 6 and 7 is a control instrument, utilizing the preferred form of my invention and a galvanometer, adapted to close an electrical switch when the indicating voltage delivered to the galvanometer falls below a certain value. One of its applications would be in the control of an electric furnace in response to the potential of a thermocouple. As long as the temperature of the furnace is at the desired value, the heating circuit remains open and the heat off. As soon as the temperature drops below the desired value, the change of voltage generated by the thermocouple connected to my control instrument quickly and effectively closes the electrical circuit governing the heat source of the furnace and thus tends to restore the furnace to the desired operating temperature, which when restored would cause the heat to be turned off by reverse operation.

In Figures 5, 6 and 7 the reference number 1 as in the previous figures indicates a galvanometer in which a small armature coil 2 is rotatable through a magnetic field produced by magnet 3. Magnet 3 is partially broken away so as not to interfere with the illustration of the particular details of my invention. Coil 2 of galvanometer 1 is suitably connected to an electrical bridge circuit or directly to a thermocouple, electrode or other voltage producing measuring device. Pointer 4 attached to coil 2 of galvanometer 1 has a thin aluminum foil vane 5 attached to it. Advantageously, the foil is attached outside of magnet 3 so as not to interfere with it in the normal swing of pointer 4.

A thin nickel-chromium alloy ribbon 14 is mounted to the galvanometer casing (not shown) in such a manner that it is in the form of an inverted rectangular U and is connected to a low voltage power source. Each leg of the U, 15 and 16, is trimmed to a reduced cross section from that of the rest of ribbon 14. When electrical current passes through the ribbon the energy dissipation by the ribbon is concentrated in those portions which have a reduced cross section and thus legs 15 and 16 form a pair of effective radiant heat sources. In order to prevent loss of radiated heat from filaments 15 and 16 in undesired directions a pair of reflectors, 17 and 18, are placed behind heat sources 15 and 16, respectively. Vane 5 preferably is cut to a length slightly greater than the filaments and to a width equal to the spacing of filaments and operates, by rotation of pointer 4, in an arcuate path which passes directly in front of filaments 15 and 16.

Two temperature responsive bimetallic strips, 19 and 20, are spaced approximately the same as filaments 15 and 16 with the path of vane 5 lying between strips 19 and 20 and their respective filaments 15 and 16. Strips 19 and 20 are fixed at their upper ends to insulated spacing bar 21 which is mounted to the casing of galvanometer 1. In the illustrated case, the low expansion side of bimetallic strips 19 and 20 face filaments 15 and 16, respectively. Electrical contacts, 22 and 23, are mounted at the free ends of bimetallic strips 19 and 20, respectively. When strips 19 and 20 have the same temperature, contacts 22 and 23 remain the same distance apart, but when strip 19 is at a higher temperature than strip 20, contacts 22 and 23 tend to close, and thus close the external circuit through the contacts. Electrical leads (not shown) connect the contacts to suitable relay circuits for controlling the processes involved.

Suitably, bimetallic strips 19 and 20 are provided with an appropriate surface finish such as black paint or a rough finish which will provide a high degree of absorption of infrared radiation.

At the desired point of operation the position of pointer 4 of galvanometer 1 is adjusted so that vane 5 intercepts equally the heat radiated to each bimetallic strip 19 and 20 from its respective heat source 15 and 16, as in the position shown in Figure 5. As long as the control voltage to coil 2 of galvanometer 1 is at the proper value, contacts 22 and 23 remain open. This is true despite ambient temperature changes within the galvanometer casing; for by arranging each bimetallic strip so that it bends in the same direction in response to a temperature increase, i. e., by facing like metals on the same side of a line drawn through the bimetallic strips, the strips maintain the contacts open so long as they are each at the same temperature. In such a state, the bimetallic strips may be described as being in thermal balance. However, when vane 5 moves counter-clockwise from the balanced position due to a decrease in the control voltage, as is shown in Figure 7, more heat is radiated to bimetallic strip 20 than to strip 19, and thus the strips tend to bend together causing contacts 22 and 23 to close. Thus the instrument is an electrical switch which when included in an external circuit through contacts 22 and 23 governs a signal or an alarm or directly controls the process variable to which the control voltage applied to coil 2 is responsive. If vane 5 moves clockwise, as in the case of overcontrol, the instrument does not close contacts 22 and 23 since strips 19 and 20 will bend apart further.

It is perfectly clear that the electrical contact system I have indicated may be varied to a considerable extent. For example, bimetallic strip 19 may have two contacts 22 and 24 mounted at its free end separated by insulator 26 as indicated in Figure 8. Contacts 22 and 23, and 24 and 25 remain out of contact when vane 5 is centered. Unbalance in the temperatures of strips 19 and 20 caused by a clockwise change in the position of vane 5 will cause contacts 24 and 25 to close, while a counterclockwise change from the balanced state will cause contacts 22 and 23 to close. Obviously, the apparatus of Figure 8 may be also utilized without contacts 22 and 23, solely with contacts 24 and 25, in which case it would operate in just the opposite manner as the device shown in Figures 5, 6 and 7.

The instrument which I have illustrated in Figures 5, 6 and 7 causes a relative movement of contacts 22 and 23 of as much as three times the movement of vane 5 producing such movement. That is, a 0.001 inch movement of vane 5 will move contacts 0.003 inch relative to each other, if free, or change the contact pressure by 0.5 gram if engaged.

I have found, that when the instrument of Figures 5, 6 and 7 is started from the cold position, i. e., before current passes through filament 14, a total of four watts of power to the filaments causes the free ends of the strips 18 and 19 to move one-quarter of an inch, but with no relative change in contact position. For this measurement the vane is removed so it does not intercept any heat from the filaments to the strips. I have further found both strips move one-eighth of an inch relative to each other from centered vane position to a position in which the vane completely intercepts heat radiated to one and does not intercept any heat radiated to the other. This is equivalent to a 25° F. change in temperature in each strip. Actual movement of both vanes due to ambient temperature fluctuations equally felt by both while in equilibrium, i. e., centered vane position, may be as much as one-sixteenth of an inch.

The ratio of relative contact movement to vane is governed by many factors: material, length and thickness of the bimetallic strips, energy radiated by the filaments, and by the positioning of the interposed vane. For example, the closer the vane is to the heat sources and the farther it is from the bimetallic strips, the higher the ratio of contact to vane movement, since the bimetallic strips will receive a relatively greater change in radiated heat for a given angular motion of the vane.

The control functions have been described as they would be used with the control apparatus located at the midscale position of the armature. These control functions will operate in a similar manner when used with the control apparatus located anywhere between the zero and full scale positions of the armature. The filaments and the bimetallic strips may be mounted on a movable arm pivoted about the same center of the armature and may be arbitrarily set for any value between zero and full scale.

In general, the variations in the heat radiated to the strips as controlled by the vane position may be calculated in a simple manner. If we assume that the heat radiated from each heat source to its associated metallic strip, if no vane were interposed, is represented by H. that is, the heat radiated through the sector indicated by the dotted line in Figure 7 from heat source 15 to bimetal strip 19, it is obvious that, in the thermally balanced condition illustrated in Figure 6

$$\frac{H}{2}$$

is the heat radiated to each bimetal strip when the vane is centrally located. If D is the distance the vane must move to intercept the entire radiation sector from each heat source to its associated bimetallic strip, when the edge of the vane has a distance $d$ from the central position, the heat to one strip is represented by the formula:

$$\frac{H}{2}-\frac{dH}{D}$$

and the heat to the other strip is represented by the formula $$\frac{H}{2}+\frac{dH}{D}$$

The change in heat flow or difference of two strips is represented thus:

$$\frac{H}{2}+\frac{dH}{D}-\left(\frac{H}{2}-\frac{dH}{D}\right)=\frac{2dH}{D}$$

There are two important characteristics of this apparatus which determine the departure of the controlled variable from the desired value. The first is the difference in vane position at which the contacts open and at which they close. This difference, known as "overlap," is less than 0.003 inch in this apparatus and establishes the minimum vane movement required before any change in control action will occur. The departure of the vane from its mid-position will then be plus or minus 0.0015 inch. The second characteristic is a time lag, which may be less than one second, from the moment the vane passes its mid-position to the moment the contacts function. This time lag multiplied by the rate of deviation of the controlled variable will indicate the plus or minus departure from the desired value. In this instance the vane must be oscillating about its mid-position, a condition which occurs when the apparatus is used as an on-off controller.

The choice of material for the moving vane is of course influenced by the desirable optimum of 100 per cent heat reflecting ability. For this purpose metals are generally best. However, any material opaque to radiant heat will suffice, even such materials as paper and dark glass. In choosing materials of the latter classes, however, care should be exercised to avoid materials which tend to absorb radiant heat and reradiate it in a substantial degree.

I claim:

1. A control instrument comprising heat radiating means, a first thermally responsive bi-metallic element mounted at one end and associated with said heat radiating means to receive heat radiated therefrom, a second thermally responsive bi-metallic element mounted at one end and associated with said heat radiating means to receive heat radiated therefrom, said first and second bi-metallic elements being associated with each other and positioned with their free ends adjacent to each other whereby similar changes in their temperatures cause them to deflect without relative change in separation of their free ends and dissimilar changes in their temperatures cause them to deflect with change in the relative separation of their free ends, and a movable vane which is opaque to radiant heat mounted with its path of travel passing between said heat radiating means and each of said associated bi-metallic elements.

2. A control instrument according to claim 1 in which the bimetallic elements are adapted to open an electric switch as the first moves in response to an increase of its temperature.

3. A control instrument according to claim 1 in which the bimetallic elements are adapted to close an electric switch as the first moves in response to an increase of its temperature.

4. A control instrument comprising a first radiant heat source, a first thermally responsive bimetallic element mounted at one end and associated with said first heat source to receive heat radiated therefrom, a second radiant heat source, a second thermally responsive bimetallic element mounted at one end associated with said second heat source to receive heat radiated therefrom, said associated pair of bimetallic elements being positioned with their free ends adjacent to each other whereby similar changes in temperature of the elements cause them to deflect without relative change in separation of their free ends and dissimilar changes in temperature of the elements cause them to deflect with change in the relative separation of their free ends, and a movable vane which is opaque to radiant heat mounted with its path of travel passing between each said heat source and its associated bimetallic element.

5. A control instrument according to claim 4 in which each radiant heat source has a heat reflector disposed behind it in relation to its associated bimetallic element.

6. A control instrument according to claim 4 in which the two bimetallic elements are adapted to close an electric switch as the temperature of the first is increased above that of the second.

7. A control instrument according to claim 4 in which the two bimetallic elements are adapted to open an electric switch in response to an increase in the temperature of the first above that of the second.

8. A control instrument according to claim 4 in which the two bimetallic elements are adapted to close a first electric switch when the temperature of the first of said bimetallic elements exceeds that of the second and in which the two bimetallic elements are further adapted to close a second electric switch when the temperature of the second of said bimetallic elements exceeds that of the first.

9. A control instrument according to claim 4 which further includes a galvanometer, to the armature of which the movable vane is attached.

References Cited in the file of this patent

UNITED STATES PATENTS

| | | |
|---|---|---|
| 1,498,077 | Doman | June 17, 1934 |
| 1,944,721 | Sell | Jan. 23, 1934 |
| 2,305,446 | Saul | Dec. 15, 1942 |

FOREIGN PATENTS

| | | |
|---|---|---|
| 622,282 | Germany | Nov. 25, 1935 |
| 878,493 | France | Oct. 12, 1942 |